Dec. 22, 1931.    H. A. WINTER    1,837,308
COMBINED HINGE AND LOCK FOR DUMP BODIES
Filed July 7, 1930
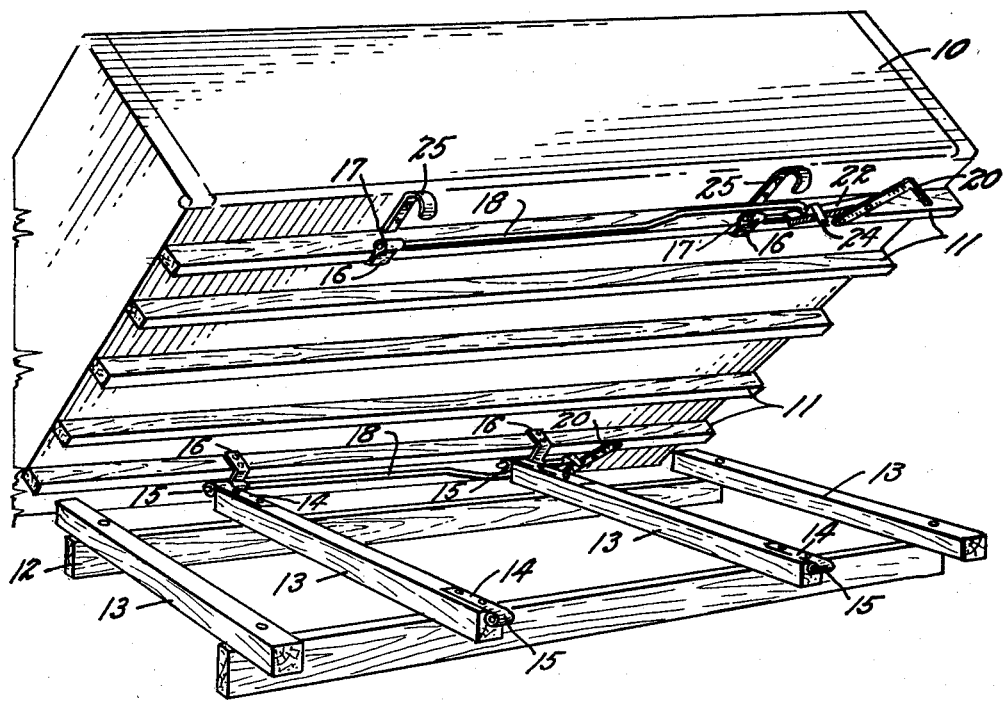
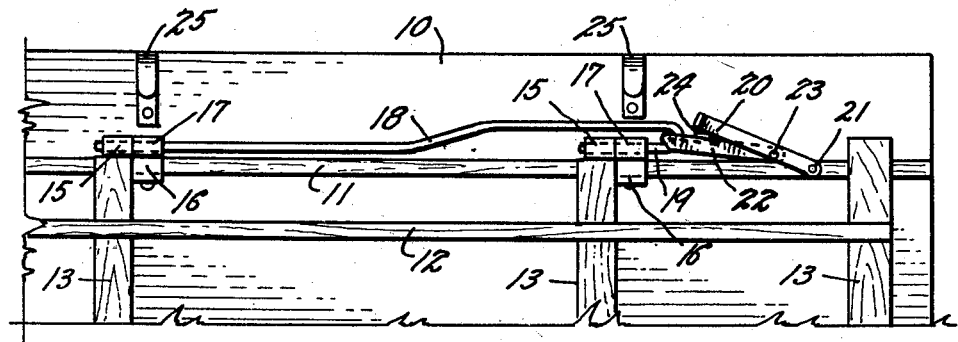
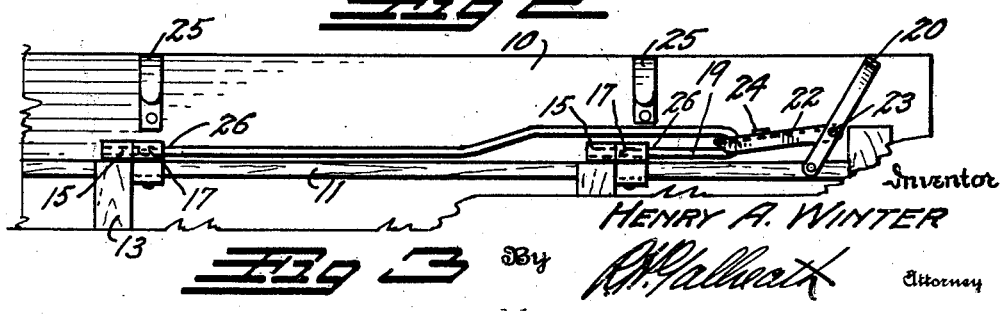
Inventor
HENRY A. WINTER Patented Dec. 22, 1931

1,837,308

UNITED STATES PATENT OFFICE

HENRY A. WINTER, OF DENVER, COLORADO

COMBINED HINGE AND LOCK FOR DUMP BODIES

Application filed July 7, 1930. Serial No. 466,159.

This invention relates to a vehicle body of the dumping type and more particularly to a combined hinge and lock structure therefor. The principal object of the invention is to provide a device which will operate both as a hinge and as a lock so that either or both sides of the dumping body can be locked in position and so that either side may be used as a hinge to allow the body to be dumped toward that side.

Another object of the invention is to so construct the device that when in the locked position it will securely clamp the body to the chassis or sub-frame and eliminate rattling or vibration.

A further object is to so construct the device that by the manipulation of a simple lever the locking bar will be quickly and easily released for dumping or positioned in place as a hinge pin.

Other objects and advantages reside in the detail construction of the invention, which is designed for simplicity, economy, and efficiency. These will become more apparent from the following description.

In the following description of the invention reference is had to the accompanying drawings which form a part hereof. Like numerals refer to like parts in all views of the drawings and throughout the description.

In the drawings:

Fig. 1 is a perspective view illustrating a typical body in the dumping position upon its sub-frame.

Figs. 2 and 3 are detail views of the combined hinge and lock mechanism. These views illustrate fragmentary bottom views, looking upward, of a typical body. In Fig. 2 the device is illustrated in the locked position and in Fig. 3 in the unlocked position.

In the drawings, a typical dump body of the type commonly employed for farm purposes is illustrated at 10 with its floor beams at 11. Bodies of this type are usually mounted upon a sub-frame consisting of a pair of stringers, such as indicated at 12, which in use are attached to the side chassis members of an automobile truck. The stringers 12 are connected by a series of cross sills 13.

In applying the invention to a body of this type, plates 14 are secured to the extremities of two of the sills 13. The plates 14 terminate in cylindrical sleeves 15. Four fittings 16 are secured to the floor beams 11. These fittings also terminate in cylindrical sleeves such as indicated at 17. The plates 14 and the fittings 16 are so positioned that when the body 10 is resting in its normal position on the sub-frame, each of the sleeves 15 will align with one of the sleeves 17.

A combined hinge and latch bar 18 is slidably mounted in the fitting sleeves 17. One extremity of the latch bar 18 is turned backwardly upon itself as indicated at 19 so that both extremities will extend into the sleeve 17 in the same direction. The latch bar 18 is actuated by means of an operating lever 20, which may be pivoted to one of the floor beams 11 upon a suitable pivot pin or bolt 21.

The lever 20 is connected to the latch bar 18 by means of a link member 22. This link member is preferably formed of angle iron, one leg of the angle being perforated so that the looped extremity 19 of the latch bar 18 may be passed therethrough. The other extremity of the link member 22 is hinged at 23 upon the lever 20. A stop 24 is secured to and projects from the link member 22 to limit the closing movement of the lever 20.

During ordinary use of the body 10 the two latch bars 18 are in the position of Fig. 2 with their extremities projected through both the sleeves 15 and 17. In this position they act to securely lock the body 10 to the sub-frame.

Should it be desired to dump the body, for instance to the right, the lever 20 on the left side is swung to the position of Fig. 3. This causes it to act through the link member 22 to withdraw the extremities of the left hand latch bar 18 from the sleeves 15 upon that side of the body. The left side of the body can now be elevated causing the right hand latch bar 18 to act as a hinge pin. For left hand dumping the above process is reversed.

Bodies of this character are more particularly useful for hauling sugar beets and the like from the field to the beet dump at the railroad. Beet dumps are provided with hoists for dumping the bodies and suitable hoist hooks 25 are secured to each side of the body by means of which the side of the body 10 may be raised for dumping.

It is preferred to taper the extremities of the latch bars 18 as indicated at 26, so as to facilitate their entrance into the sleeves 15, should the two co-acting sleeves be slightly out of alignment, and to cause them to exert a wedging action, which will eliminate any rattling or vibration and which will act to frictionally maintain the latch bar in place.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. In a vehicle body of the dump type, a series of longitudinally extending floor beams beneath said body and secured thereto; a series of laterally extending cross sills beneath said floor beams and free therefrom; plates secured to the opposite extremities of certain of said sills; cylindrical sleeves formed at the outer extremities of said plates; fittings secured to certain of said floor beams; cylindrical sleeves formed on said fittings arranged so that when said body is in position the sleeves on said plates will align with the sleeves on said fittings; a combined hinge and latch bar slidably mounted in the sleeves on said fittings, one extremity of said latch bar being turned backwardly upon itself so that both extremities will extend into said latter sleeves in the same direction; an operating lever pivoted to each of the floor beams to which said fittings are attached; a link member hinged to each of said operating levers said link member being perforated so as to receive the turned back extremity of said latch bar so that when said operating lever is moved in one direction both extremities of said latch bar will be projected into the sleeves on said plates and when moved in the other direction they will be withdrawn therefrom.

2. In a vehicle body of the dump type, a series of longitudinally extending floor beams beneath said body and secured thereto; a series of laterally extending cross sills beneath said floor beams and free therefrom; plates secured to the opposite extremities of certain of said sills; cylindrical sleeves formed at the outer extremities of said plates; fittings secured to certain of said floor beams; cylindrical sleeves formed on said fittings arranged so that when said body is in position the sleeves on said plates will align with the sleeves on said fittings; a combined hinge and latch bar slidably mounted in the sleeves on said fittings, one extremity of said latch bar being turned backwardly upon itself so that both extremities will extend into said latter sleeves in the same direction; an operating lever pivoted to each of the floor beams to which said fittings are attached; a link member hinged to each of said operating levers said link member being perforated so as to receive the turned back extremity of said latch bar so that when said operating lever is moved in one direction both extremities of said latch bar will be projected into the sleeves on said plates and when moved in the other direction they will be withdrawn therefrom; and a stop member secured to and projecting from said link member so as to limit the closing movement of said operating lever.

In testimony whereof, I affix my signature.

HENRY A. WINTER.